(12) United States Patent
Fukui et al.

(10) Patent No.: US 12,163,575 B2
(45) Date of Patent: Dec. 10, 2024

(54) WET END PORTION SEAL MEMBER FOR BALL SCREW, AND BALL SCREW EMPLOYING SAID SEAL MEMBER

(71) Applicant: SANWA TECHNO CO., LTD, Kobe (JP)

(72) Inventors: Kazuro Fukui, Kobe (JP); Masashi Kouhara, Kobe (JP); Toshio Takino, Kobe (JP); Kaito Oomae, Kobe (JP)

(73) Assignee: SANWA TECHNO CO., LTD., Kobe (JP)

( * ) Notice: Subject to any disclaimer, the term of this patent is extended or adjusted under 35 U.S.C. 154(b) by 407 days.

(21) Appl. No.: 17/282,873

(22) PCT Filed: Oct. 3, 2019

(86) PCT No.: PCT/JP2019/039218
§ 371 (c)(1),
(2) Date: Oct. 5, 2021

(87) PCT Pub. No.: WO2020/071515
PCT Pub. Date: Apr. 9, 2020

(65) Prior Publication Data
US 2022/0090661 A1    Mar. 24, 2022

(30) Foreign Application Priority Data
Oct. 3, 2018   (JP) ................................ 2018-187828

(51) Int. Cl.
*F16H 25/24*     (2006.01)
*D03D 27/00*    (2006.01)
(Continued)

(52) U.S. Cl.
CPC ......... *F16H 25/2418* (2013.01); *D03D 27/00* (2013.01); *D04B 1/02* (2013.01); *D04B 21/02* (2013.01); *F16H 25/2204* (2013.01)

(58) Field of Classification Search
CPC ............. F16H 25/2418; F16H 25/2204; F16H 2025/249; F16H 57/0497; D03D 27/00; D04B 1/02; D04B 21/02
See application file for complete search history.

(56) References Cited

FOREIGN PATENT DOCUMENTS

| CN | 2597761 Y | * 12/2002 | ......... F16H 25/2418 |
| DE | 4397754 B4 | *  5/2011 | .......... C10M 105/18 |

(Continued)

OTHER PUBLICATIONS

International Search Report dated Dec. 24, 2019, issued in counterpart application No. PCT/JP2019/039218, w/English translation (5 pages).
(Continued)

*Primary Examiner* — Zakaria Elahmadi
(74) *Attorney, Agent, or Firm* — WHDA, LLP

(57) ABSTRACT

A ball screw in which a nut and a male-threaded shaft provided with an arcuate continuous groove threadedly engage by way of a multiplicity of steel spheres inserted between the male threads and female threads, the end portion seal member is capable of being attached toward a front or toward a back from said nut, and has a support frame body arranged at an outside circumference of said male-threaded shaft; a base fabric portion, a back surface of which is secured to an inside circumferential surface of said support frame body; and the cut pile that protrudes in such fashion as to be directed toward said groove from a front surface of said base fabric portion; wherein fiber tip portions of said cut pile are bent and made to abut said groove so as to occlude a gap between said groove and said support body, and good lubricant is retained.

8 Claims, 3 Drawing Sheets

(51) Int. Cl.
*D04B 1/02* (2006.01)
*D04B 21/02* (2006.01)
*F16H 25/22* (2006.01)

(56) References Cited

FOREIGN PATENT DOCUMENTS

| | | | | | |
|---|---|---|---|---|---|
| JP | 3065136 | U | * | 10/1999 | |
| JP | 2005200811 | A | * | 7/2005 | ............ D03D 27/00 |
| JP | 2011-231843 | A | | 11/2011 | |
| JP | 2013-002602 | A | | 1/2013 | |
| JP | 2014-88886 | A | | 5/2014 | |
| JP | 2017-9077 | A | | 1/2017 | |
| JP | 2018115688 | A | * | 7/2018 | ............ F16H 25/24 |
| WO | 2015/086138 | A1 | | 6/2015 | |

OTHER PUBLICATIONS

Written Opinion dated Dec. 24, 2019, issued in counterpart application No. PCT/JP2019/039218, w/English translation (10 pages).

* cited by examiner

WET END PORTION SEAL MEMBER FOR BALL SCREW, AND BALL SCREW EMPLOYING SAID SEAL MEMBER

TECHNICAL FIELD

The present invention relates to a wet end portion seal member for a ball screw, and to a ball screw employing said seal member.

A ball screw is a mechanical component which converts rotational motion into linear motion, and which is a special type of feed screw in which, to increase efficiency of the screw, a multiplicity of steel spheres are inserted between a nut and a male-threaded shaft having an arcuate groove, such that sliding friction is changed into rolling friction. That the conversion between rotational motion and linear motion is reversible is a reflection of the fact that it is an excellent mechanism which permits attainment of higher screw efficiencies than possible with an ordinary screw. The present invention relates to an end portion sealing member for sealing a gap between an arcuate groove at a threaded shaft in such a ball screw, and an end portion of a nut or an end portion of a retainer member.

It relates to a wet seal member such as may be attached at either end of a nut portion, or at either end of a retainer portion, in such fashion as to cause a pile portion to encroach upon an arcuate groove of a threaded shaft, such as will prevent ingress of contaminant into a retainer and/or nut when a nut or a retainer encasing a nut is driven forward and backward on the screw in rotary fashion along the threaded groove, and such as moreover by means of grease maintains protection against dust and is made to have increased life, and to a ball screw employing same. Ball screws in accordance with the present invention include those which are of the retainer type.

BACKGROUND ART

Now, in terms of mechanical motion, there is linear motion and rotational motion, and while positioning mechanisms for each are known, as compared with the situation for rotational motion in which shaft supports that employ bearings and the like enjoy widespread practical use, practical implementation of rolling bodies for linear motion, being the more sophisticated, has been extremely difficult technologically. Of course, ability to employ rolling bodies for linear motion would bring with it the promise of increased utility, as coefficients of rolling friction are low, resistance to initiation of movement is also low, and so forth. But to actually achieve this, because it would be necessary to provide a linear motion mechanism such as would be a mechanism that satisfies a number of requirements which include the requirement that it have high stiffness and that it operate at high speed with light movement and low force, and the requirement that the mechanism have high accuracy in positioning and long life, it has not by any means been easy as a practical matter to meet the required criteria. And at the present time there is all the more demand for additional ingenuity to address such needs.

And because ball screws are such that it desired of the mechanical components therein that they be such as will permit a nut (or a retainer which encases a nut) to move forward and backward while engaging in store-opening motion on a threaded shaft smoothly in precise and stable fashion over a long period of time, adequate endurance is required, for which reason lubrication characteristics and protection against dust are perceived to be important. For example, if particulate or contaminant enters the interior of the nut or retainer, this will cause ability of the balls to flow along the groove to deteriorate, which will greatly reduce ball screw life. Furthermore, the resulting increase in friction may also lead to faulty operation. Because it is also the case that ball screws are used in environments in which particulate, contaminants from cutting, and/or other such dust is present in large amounts, problems tend to occur due to dust and so forth. It is therefore not unlikely that this could even lead to faulty operation of the entire equipment and/or machinery in which the ball screw is employed.

To permit continued operation despite use in an environment in which particulate and/or contaminants are present in large amounts, a mechanism has therefore been proposed in which the entire ball screw is covered with a bellows so as to prevent entry of contaminants into the device. However, where this is covered with a bellows this will cause the region peripheral to the mechanism to be covered to a great extent, and it can hardly be said that this would be conducive to ease of maintenance, since it would be necessary to remove the bellows and so forth. Furthermore, even where this is covered by a bellows, because it is not an easy matter to completely stop entry thereinto of particulate and contaminant, and because any particulate or contaminant that manages to gain entry into the interior of the bellows will straightaway lead to faulty operation, this has made it difficult to reduce the frequency of maintenance operations.

To avoid situations in which particulate or contaminant might otherwise enter the interior of the linear motion guide slider unit and cause faulty operation, stratagems are therefore employed in which sealing member(s) made up of any one or plurality of nitrile rubber(s) and/or other such synthetic rubber(s), resin(s), metal scraper(s), and/or brush(es) are installed in gap(s) between rolling body or bodies and slider(s) and/or slider end portion(s), and/or in which seal member(s) composed of synthetic resin(s) made up of elastic body or bodies mounted between chain inner plate(s) and outer plate(s) in such fashion as to abut plate(s) are installed (see, for example, Patent Reference No. 1).

However, as there is a tendency for small gaps to occur between the rolling contact surface of the slider and the sealing member, and as it will be necessary to carry out manufacturing in exacting fashion in advance so as to cause the sealing member to be of prescribed shape in an attempt to reduce such gaps, this causes increase in the manufacturing cost of the sealing member. Furthermore, because the seal member itself is made of solid rubber or other such material, there is a tendency for it to undergo deformation and/or chipping due to contaminants; and once chipping has occurred, there will be concern that large amounts of contaminants may flow thereinto by way of the chipped location. Furthermore, adjustment such as will ensure exacting seal characteristics is not an easy matter, it being the case that when one uses a jig or the like during attachment of the seal unit to cause it to abut the rail in an attempt to eliminate any gaps so that it might serve in its role as seal member, this then causes increase in the torque that acts thereat, as a result of which there is occurrence of problems such as the fact that friction during reciprocating motion increases and so forth. What is more, applying to this to the situation that exists with a ball screw, because in a ball screw the threaded groove is present in arcuate fashion and because the balls travel therealong, the shape is complicated and can hardly be described as being capable of being easily sealed.

Furthermore, existing units are such that sealing and lubrication take place at different parts. Because these are equipped with an arrangement in which, separate from any end seal that may be provided, grease is continuously delivered from nonwoven fabric, fiber net, or other such grease retention mechanism, this increases the size of the dimensions when attached and causes reduction in the drivable range, and has also been a factor in causing increase in the size of the device. Furthermore, if grease is assimilated by particulate and/or contaminant such that clumps are formed, because this will cause considerable occurrence of deformation and/or chipping of seal members, operation under conditions in which seal characteristics are inadequate has also been a cause of occurrence of faulty operation of the ball screw mechanism.

Moreover, wear and/or deformation of sealing members occurring due to repeated motion causes occurrence of abrasion at sealing members, resulting in loss of seal function, which can lead to faulty operation due to entry of contaminant and/or particulate into the slider interior and/or migration of lubricant. As it has therefore been essential in practice for attainment of stable operations to frequently carry out cleaning and replacement of the grease employed for lubrication and sealing members, there has been a tendency for maintenance cost to increase.

But notwithstanding that cleaning and replacement of the grease employed for lubrication and sealing member(s) might have been frequently carried out, where a threaded groove of a ball screw has been subject to wear and tear due to particulate and/or contaminant, there has been a tendency for the sealing member following replacement to not adequately abut the threaded groove and for there to be occurrence of gaps thereat. Where this is the case, large quantities of particulate and contaminants will enter and intermingle therewith via such gaps, causing the chain(s) themselves and/or the guide mechanism(s) possessing ball screw(s) to become unusable, and making replacement of the device itself unavoidable.

In relation to linear motion mechanisms, the Applicant has therefore proposed a dry seal member employing cut pile. What has been proposed is a linear motion mechanism side seal unit in which seal members comprising cut pile are arranged at the front end portion and the back end portion of a slider, and in which a cut pile ground yarn portion having a double-woven fabric structure in which both the warp and the weft are double-woven and which comprises two layers, these being a front layer portion in which there is a front lining warp yarn and a front weft yarn, and a back layer portion in which there is a back lining warp yarn and a back weft yarn, is secured to an inner surface of a base, and in which fiber tips of napped cut pile in which tips of loops of pile fibers raised so as to be directed still further toward the inner surface from the ground yarn portion of the cut pile have been cut are arranged in such fashion as to abut and conform to the cross-sectional shape of a shaft (see, for example, Patent Reference No. 2).

Of course, there are situations in which use of cut pile alone remains inadequate for retention of long-term seal characteristics with respect to contaminants and/or powder, and in environments in which such powder includes fine powder of the sort that absorbs lubricant such as is the case with paper dust, for example, because this means that there will be sliding of dry cut pile, it has not been possible to adequately maintain protection against dust, and so there has been demand for even better seal retention characteristics. Moreover, in the context of seal mechanisms of complicated shape such as is the case with ball screws, there has been a need for an appropriate seal member and structure.

PRIOR ART REFERENCES

Patent References

Patent Reference No. 1: Japanese Patent Application Publication Kokai No. 2011-231843
Patent Reference No. 2: WO 2015/086138

SUMMARY OF INVENTION

Problem to be Solved by Invention

A problem to be solved by the invention under application is therefore to provide an end portion seal member endowed with good protection against dust and lubrication characteristics such as will permit a ball screw endowed with precision and long life to be maintained in good condition. In particular, it is to provide an end portion seal member such as will permit retention of lubrication characteristics and protection against dust over a long period of time even under harsh conditions in which there is fine dust such as will absorb lubricant and impair lubrication characteristics such as is the case not only with fine particulate of several µm but also with paper dust of several µm. And it is to cause the end portion sealing member to be such as will permit lubricant to be more easily retained and delivered over a still longer period of time. Furthermore, it is to provide a ball screw equipped with an end portion sealing member having a simple structure which is conveniently handled and has good maintenance characteristics, being such that attachment and replacement of the end portion sealing member are easily carried out. That is, it is to provide a seal member with good conformability that can be easily attached without the need to go to the trouble of carrying out exacting adjustment with respect to the manner in which it abuts during assembly, being to provide a seal member that is easily adjusted over a wide adjustable range with good conformability with respect to complicated shapes and/or wear such as may occur at locations where there is sliding at a shaft or the like, and a ball screw employing such a seal member.

Furthermore, whereas it was previously the case when carrying out maintenance operations in which the seal member was to be attached or removed or replaced that, adjustment procedures for attainment of proper seal parameters in connection with clearance having been necessary so as to ensure smooth motion characteristics of the nut and/or retainer, replacement had to be carried out by an experienced professional or the like, it is to provide a seal member having a wide adjustable range that easily permits shield characteristics to be ensured even when it is attached in unexacting fashion, and which will permit replacement to be accomplished by carrying out removal and attachment in simpler fashion.

In addition, it is to provide a mechanism for a seal member permitting easy attachment and replacement.

Means for Solving Problem

A first means for solving problem(s) to be solved by the present invention, in the context of a ball screw in which a nut and a male-threaded shaft provided with an arcuate continuous groove threadedly engage by way of a multiplicity of steel spheres inserted between the male threads and female threads, the nut being capable of being made to travel forward and backward along the male-threaded shaft, is a wet end portion seal member comprising cut pile characterized in that the end portion seal member is capable of being attached toward a front or toward a back from said nut, and has a support frame body arranged at an outside circumference of said male-threaded shaft;

a base fabric portion, a back surface of which is secured to an inside circumferential surface of said support frame body; and the cut pile that protrudes in such fashion as to be directed toward said groove from a front surface of said base fabric portion;

wherein fiber tip portions of said cut pile are bent and made to abut said groove in such fashion as to occlude a gap between said groove and said support frame body; and a lubricant has been made to be retained in advance in spaces between pile fibers of said cut pile.

A second means in accordance with the present invention is the end portion seal member comprising the cut pile according to the first means characterized in that the cut pile is helically arranged at an inside circumference of the support frame body in such fashion as to oppose the groove for a length corresponding to not less than one rotation of the outside circumference of the male-threaded shaft. It is preferred that the cut pile be helically arranged at the inside circumference of the support frame body in such fashion as to oppose the groove for a length corresponding to not less than two rotations of the outside circumference of the male-threaded shaft.

A third means in accordance with the present invention is the end portion seal member according to any one among the first and second means characterized in that the lubricant retained in the spaces between the pile fibers of the cut pile is grease for which a grade number as defined at JIS K2220 is No. 1 to No. 4. That is, it is grease for which the worked penetration range is 175 to 340. The grease may moreover also be made to be retained by the base fabric of the cut pile.

A fourth means in accordance with the present invention is the end portion seal member according to the third means characterized in that the grease is any among lithium grease, grease in which molybdenum compound has been blended, and urea-type grease. Lithium grease refers to lithium-soap-type grease, to which molybdenum disulfide may be added. Urea-type grease refers, for example, to greases such as diurea grease, triurea grease, and tetraurea grease.

A fifth means in accordance with the present invention is the end portion seal member according to any one among the first through fourth means characterized in that pile length of the cut pile is not less than 2 mm. Because it is a length such as will permit the pile fiber tips to be deflected and become enmeshed within the gap between said groove and the inside circumference of the support frame body, being a length such as will permit bending within the gap, it is preferred that pile length be not less than 2 mm. It is more preferred that this be not less than 3 mm.

A sixth means in accordance with the present invention is the end portion seal member according to any one among the first through fifth means characterized in that the pile fibers of the cut pile consist of crimped multifilament fiber. Furthermore, besides circular cross-section, the cross-sections of the respective filaments of the crimped pile fiber might moreover be of star-like shape or "*"-like shape, or might be of hollow cross-section or other such modified cross-section, a cross-sectional shape such as will cause there to be increased surface area being preferred.

A seventh means in accordance with the present invention is the end portion seal member according to any one among the first through sixth means characterized in that the cut pile comprises woven fabric.

An eighth means in accordance with the present invention is the end portion seal member according to any one among the first through sixth means characterized in that the cut pile comprises knit fabric.

An eighth means in accordance with the present invention is the ball screw provided with the male-threaded shaft, the nut, and the steel spheres wherein the end portion seal member according to any among the first through seventh means is secured in removably attachable and replaceable fashion toward each the front and the back from said nut.

Benefit of Invention

The foregoing means for solving problem(s) to be solved by the present invention are such that the end portion seal member is in a state such that lubricant has been made to be retained in advance therein, and the fiber tips of the pile at the cut pile abut the arcuate groove of the male-threaded shaft and are made to bend. That is, because the pile fiber tip portions are made to deflect and become substantially enmeshed within the gap between the inside circumference of the support frame body and the groove, there is a high degree of crowding and the gap remains well-occluded during helical rotary motion, as a result of which it is possible to remove contaminants such as dust and/or fine particulate that would otherwise enter by way of space(s) between it and the groove. Moreover, because this is in a state such that grease or other such lubricant has been made to be retained in advance in the spaces between the pile fibers, and because it is also possible for the pile to retain such lubricant for a long period of time following forward and backward movement, the fact that the fiber tips which are enmeshed within the gap are also made to slide in smooth fashion by the lubricant means that there is little tendency for movement to worsen due to friction, and the fact that lubricant is retained in the spaces between pile strands in such fashion as not to interfere with the smooth motion of the nut means that shielding effect is heightened in accompaniment to viscosity, as a result of which good protection against dust can be obtained over a long period of time. That is, more than delivery of lubricant for smooth driving, the fact that it is retained at the base fabric and in the spaces between pile strands after the fashion of a moisturizing agent for maintenance of shield characteristics makes it possible to provide appropriate viscosity such as will dampen the fiber tips, as a result of which good shield characteristics can be obtained for a long period of time.

In addition, if the lubricant for maintenance of the shield is a grease of appropriate grade, because it will be possible for an adequate amount thereof to be made to be retained in advance in the spaces between the pile fibers and it will be possible even after this has repeatedly been made to engage in forward and backward movement while being made to engage in rotary motion for a state in which the grease is retained in the spaces between the fibers to be maintained for a long period of time, it will be possible for shield characteristics to be stably maintained for a long period of time in the form of pile which is furnished with a viscid wet shield.

Because the cut pile of the seal member is arranged so as to helically oppose the groove where it is wrapped about the male-threaded shaft, it is possible to ensure that the distance over which contact is made with the cut pile at a time when there is movement within the groove will be long. This being the case, while it is not easy to accomplish shielding of grooves of complicated three-dimensional shape such as is the case with the arcuate groove of a male-threaded groove, because during movement the distance over which the cut pile makes contact with the groove is made to be long, not only is it possible to easily increase shield capability, but because it is wetted by grease and/or the like it is also the case that there is no extreme increase in frictional resistance despite the fact that this is being accomplished by means of cut pile which may be in an abutting relationship therewith such that it is made to bend, and so it is possible to maintain smooth movement, there being no impediment which arises that would interfere with movement of the nut.

Furthermore, if the lubricant which is made to be retained in the spaces between the pile strands is a grease of appropriate grade, it will be possible to achieve protection against dust and fine powder of several µm for a long period of time. Moreover, because it will be possible, even in the case of dust such as that in which paper fibers soak up oil, such as is the case with fine paper dust of several µm, to sustain a moisturized state of a certain degree and maintain a state in which grease is retained by pile without excessive absorption of grease by paper fibers, there being no impairment of seal characteristics or lubrication characteristics, the nut (retainer) will continue to operate in smooth fashion for a long period of time.

Due to the fact that the fiber tips which form the shield bend and are made to enter the gap at the groove such that they are enmeshed therewithin, not only does this facilitate prevention of entry of dust and so forth thereinto, but because frictional resistance is low due to the fact that sliding occurs while wet and because the movement of the nut is not interfered with, no impediment arises in connection with causing crowding such as will produce bending. When the seal member is to be attached or removed or replaced, because bending of the seal member therefore makes adjustment of clearance possible without requiring that exacting adjustment of clearance be carried out by an experienced professional, ensurance of appropriate shield characteristics is facilitated. Especially where the groove is arcuately recessed, and for the very reason that pile fiber length is such as will cause it to be bent, this permits attainment of adequate crowding thereof, such that even where the depth of the groove is not uniform, it is possible for the pile to conform thereto.

When the seal member is to be attached or removed or replaced as is periodically required, as it will therefore be possible by merely supplying the customer with a seal member replacement part to carry out replacement in simple fashion without any need for long years of experience and without any need to dispatch an experienced professional, this will make it possible to ensure that stable shield characteristics can be achieved without any need to carry out periodic adjustment. Because attachment and removal is thus easily carried out, replacement for operational maintenance can be performed as deemed appropriate by on-site personnel, it being possible to achieve good seal performance even when replacement is carried out by inexperienced persons in comparatively imprecise fashion.

That is, the pile of the seal member that is placed in an abutting relationship therewith is such that the reactive force produced at the time that the pile fibers bend causes it to tend to abut the groove in comparatively uniform fashion. Furthermore, because the pile fiber tips are deflected and become enmeshed within the gap so as to encroach thereupon, in addition to the fact that there is a tendency for these to crowd together in uniform fashion due to the reactive force produced by the pile at the time that the pile is installed, because it is also the case that the pile which is enmeshed therewithin will occlude the gap notwithstanding that some nonuniformity may exist, seal characteristics tend not to be impaired, and moreover because viscous wet lubricant is retained at the periphery of the pile, there is a greater tendency for seal characteristics to be maintained. By thus intentionally causing occurrence of enmeshment, adjustment is easier and proceeds more smoothly, and there is better protection against dust, than would be the case with devices employing materials which are such that frictional resistance becomes elevated unless adjustment of contact is carried out in exacting fashion such as would be the case with rubber or felt. Especially for accommodating grooves of complex helical shape, the fact that the cut pile is able to conform thereto makes it especially suitable.

Moreover, because causing lubricant to be retained in the spaces between pile fibers for achievement of seal performance makes it possible to obtain good shield characteristics, an ancillary effect of this is that it will be possible to reduce the amount of grease or the like that is used for lubrication, as a result of which it will be possible, where a grease lubricant delivery mechanism is provided at the nut, for this to be simplified. Due to the fact that a grease-containing wet sealing member is arranged in helically opposed fashion with respect to the groove for a length permitting one or two turns, it will be possible to reduce the size of the space occupied by the lubricant delivery mechanism and so forth, and it will also be possible to reduce the size of the nut or retainer.

Furthermore, by causing pile fiber to be multifilament in which the respective filaments are in a crimped state, because it is possible to increase the surface area of each pile fiber, and because it is possible to cause a large amount of grease to become capable of being entangled by and retained within the spaces between pile fibers, as this constitutes a delivery source that will deliver lubricant for a long period of time, this will make it possible for shield characteristics to be sustained for a long while.

Moreover, where the cut pile is woven fabric, because this will make it possible to ensure that the base fabric of the cut pile is of adequate thickness, this will make it possible to ensure that grease is adequately retained by the base fabric, as a result of which it will be possible to cause lubricant for sealing purposes to be capable of being delivered to the pile fibers for a longer period of time, such that even if the frequency with which the seal member is replaced is reduced there will be little tendency for seal characteristics to worsen, which will contribute to increased longevity of the seal member as well as the ball screw.

EMBODIMENTS FOR CARRYING OUT INVENTION

Figure 1:
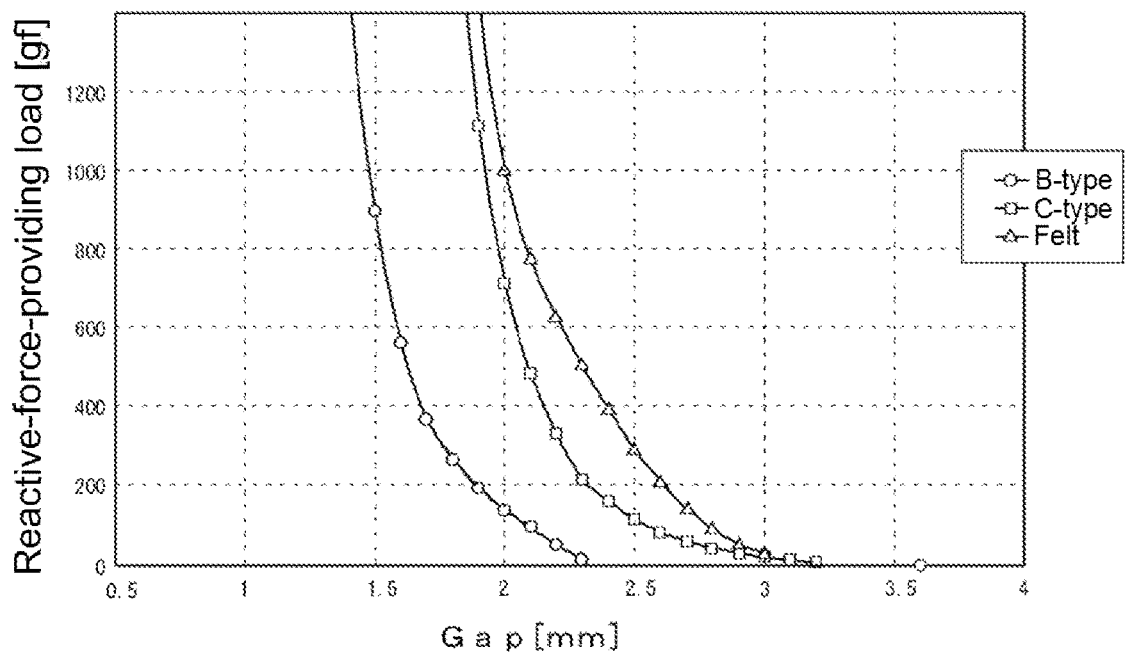
FIG. 1 Reactive-force-providing load curves indicating relationship between reactive-force-providing load (go and gap (mm) when felt or B-type or C-type pile is used.
Figure 2:
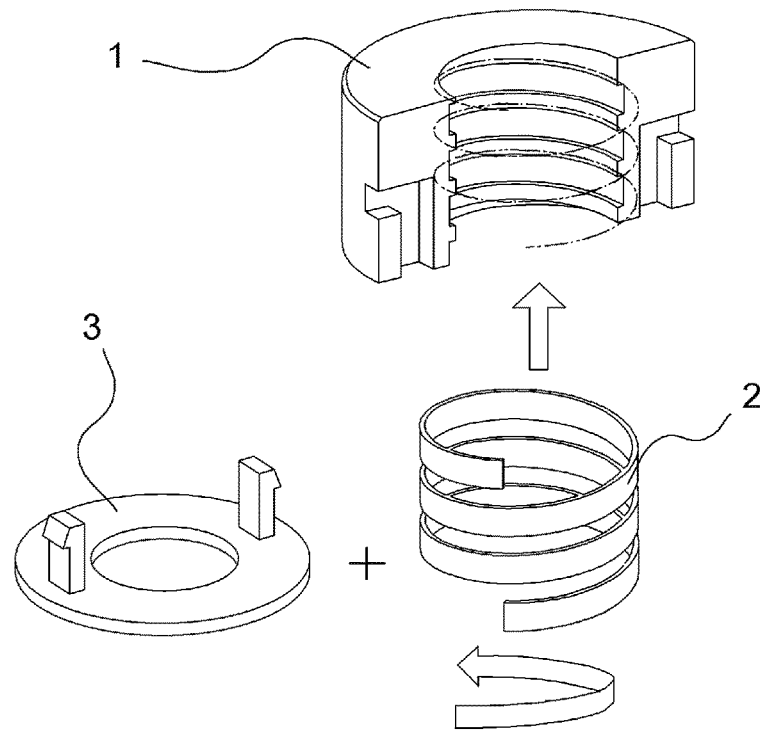
FIG. 2 Drawing illustrating an embodiment of a wet end portion seal member having cut pile in accordance with the means of the present invention. Shown is a procedure for causing a plate to be inserted in and secured to support frame bodies in such fashion as to prevent a wet sealing member from coming free from the support frame bodies after the wet sealing member which has grease-containing pile is rotated as it is inserted therein and caused to be arranged in helically opposed fashion with respect to the groove of a ball screw for a length permitting one or two turns at a location such as will cause it to be arranged in helically opposed fashion with respect to the groove of the ball screw in one of a pair of split support frame bodies that will be arranged about the outside circumference of the male-threaded shaft of the ball screw and the other of the pair of split support frame bodies is mated therewith.

Below, embodiments of the present invention are described in concrete terms with reference as appropriate to the drawings and descriptions of working examples. Note that whereas retainer-type ball screws were used in the testing that was performed on ball screws in accordance with the present invention, because there would of course not be very much that would be different if a device having a simple nut had been used, such descriptions should not be interpreted in a manner that would limit the mode of the ball screw. Furthermore, whereas at some of the testing comparing differences among fibers and materials, reference is made to the results of testing that was performed which employed linear guides, because trends exhibited when a seal member is employed at an end portion of a nut for the purpose of achieving good seal characteristics with respect to the groove of a male-threaded shaft in a ball screw as in the present invention will be similar to those of seal characteristics with respect to the rail in a linear motion guide, such data has been indicated for reference purposes.

WORKING EXAMPLES

Exemplary Test 1: Determination of Grease Retention Characteristics and Grease Deliverability of Woven Pile Fabrics and Knit Pile Fabrics in Wet End Portion Seal Members Materials and Methods Pile Subject to Evaluation In carrying out evaluation of grease retention characteristics and seal characteristics of woven pile fabric and knit pile fabric in a wet end portion seal member for a linear motion mechanism, a total of five types of woven pile fabric and knit pile fabric were selected for use in said such wet end portion seal member. Details regarding the constitutions of the woven pile fabrics and knit pile fabric that were selected are shown in TABLE 1, below.

TABLE 1

| Pile type<br>Pile properties | | P-type<br>Straight fiber<br>(woven fabric) | C-type<br>Crimped<br>(woven fabric) | G-type<br>Crimped (woven fabric) | | T-type<br>Crimped (woven fabric) | | B-type<br>Crimped (knit fabric) |
|---|---|---|---|---|---|---|---|---|
| Number of rows of pile | | 1 | 1 | 1 | 2 | 1 | 2 | 1 |
| Pile constitution | A | PPS 150D | 3.0 D Biosafe | 3.0 D Biosafe | 3.0 D Bulky | 3.0 D Aquatry | 0.5 D Belima | 1.5 D Acrylic |
| | B | — | 1.5 D Aqualon | 1.5 D Aqualon | 3.0 D Regular | 1.5 D Voidmax | — | 1.5 D Cotton |
| | C | — | 1.5 D Rayon | 1.5 D Rayon | 1.5 D Rayon | 1.5 D Rayon | — | — |
| Density (fibers/inch$^2$) | | 378,000 | 316,050 | 276,675 | | 646,400 | | 179,968 |
| Base fabric constitution | Weft yarn | Nylon (33T-6F)<br>Thermally fusible yarn (33T-6F) | Polyester (T 30/1) | Polyester (T 30/1) | | Polyester (T 30/1) | | Polyester (T 30/1) |
| | Warp yarn | Nylon (167T-8F) | Polyester/Rayon (T/R 30/2) | Polyester/Rayon (T/R 30/2) | | Polyester/Rayon (T/R 40/2) | | Polyester/Rayon (T/R 40/2) |
| | Coating | CM3200 | CM4025 | CM4025 | | CM4025 | | CM3200 |

The pile at the P-type woven pile fabric at TABLE 1 was such that the napped pile fibers therein employed one type of straight fiber. These were among those for which fiber diameter was largest among the woven pile fabrics and knit pile fabric that were selected. Density was 378,000 per square inch. In addition, the ground yarn portion of the base fabric to which the pile was secured was a double-woven fabric in which both the warp and the weft were double-woven and which comprised two layers, these being a front layer portion and a back layer portion, and which was a woven fabric in which there were weft yarns (nylon/thermally fusible yarn) and warp yarns (nylon). To reduce shedding of cut pile, the ground yarn portion of the base fabric was impregnated with an acrylic emulsion from the back side thereof.

The pile at the C-type woven pile fabric was crimped and employed hollow fibers and porous fibers, the napped pile fibers therein employing one type of mixed yarn containing 3.0-denier Biosafe, 1.5-denier Aqualon, and 1.5-denier rayon, density of which was 316,050 per square inch. In addition, the ground yarn portion of the base fabric to which the pile was secured was a double-woven fabric in which both the warp and the weft were double-woven and which comprised two layers, these being a front layer portion and a back layer portion, and which was a woven fabric in which there were weft yarns (polyester) and warp yarns (polyester/rayon). To reduce shedding of cut pile, the ground yarn portion of the base fabric was impregnated with an acrylic emulsion from the back side thereof. Due to the fact that hollow fibers and porous fibers were employed therein, surface area at the pile was greater than would have been the case had straight fibers of the same fiber diameters been employed.

Like the C-type woven pile fabric, the pile at the G-type woven pile fabric was crimped, but the crimped pile at the G-type woven pile fabric was such that half of the rows of pile were C-type pile that was crimped and that employed hollow fibers and porous fibers, while the remaining half of the rows of pile were crimped pile that employed ordinary fibers which were neither hollow nor porous. There were two types of napped pile fiber, the pile fibers being secured in alternating fashion one-type-at-a-time to the weft yarn of the ground yarn portion which constituted the base fabric. The pile in the first row was a mixed yarn containing 3.0-denier Biosafe, 1.5-denier Aqualon, and 1.5-denier rayon; the pile in the second row comprised a mixed yarn containing 3.0-denier bulky, 3.0-denier regular, and 1.5-denier rayon. Fiber density was 276,675. In addition, the ground yarn portion of the base fabric to which the pile was secured was a double-woven fabric in which both the warp and the weft were double-woven and which comprised two layers, these being a front layer portion and a back layer portion, and which was a woven fabric in which there were weft yarns (polyester) and warp yarns (polyester/rayon). To reduce shedding of cut pile, the ground yarn portion of the base fabric was impregnated with an acrylic emulsion from the back side thereof. The extent to which causing fibers employed in pile to be hollow and porous imparted grease retention characteristics and grease deliverability thereto was determined by comparing G-type woven pile fabric to C-type woven pile fabric.

The pile at the T-type woven pile fabric were crimped pile comprising multifilament employing filament of modified cross-section such that the outside circumference was split after the fashion of a "*"-like shape. The density thereof was the largest among the woven pile fabrics and knit pile fabric that were selected. While complicated and costly due to the fact that the fibers thereof were split, because the surface area thereof was greater than would have been the case had hollow and porous fibers been employed, grease retention characteristics and deliverability thereof were good.

Note that length of the pile at the foregoing respective types of pile used for testing was 3.3 mm.

The pile at the B-type knit pile fabric employed crimped pile that employed ordinary fibers. Knit properties being such as to not permit increase in pile length, thickness of the pile was less than was the case elsewhere, i.e., at the P-type, C-type, G-type, and T-type woven pile fabric, length of the pile at the pile used during testing being 2.3 mm.

Felt

In evaluating grease retention characteristics and seal characteristics of woven pile fabric and knit pile fabric in a wet end portion seal member for a linear motion mechanism, to permit comparison with pile subject to evaluation, felt (polyester felt; thickness 3 mm; density 0.2 $g/cm^2$; 0° to 120° C. operating temperature limit) of thickness close to that of the pile subject to evaluation was employed.

Grease

During evaluation of the respective lypes of pile and felt, lithium stearate greases (Grade No. 1 through No. 3) were respectively employed. Furthermore, to evaluate C-type pile, a grease of Grade No. 2 in which a molybdenum compound was blended (Mo-type), a urea-type grease of Grade No. 2 (urea-type), and a fluorinated oil used for comparative purposes were additionally employed.

Method for Evaluating Grease Retention Characteristics

The following evaluation method was used to evaluate the grease retention characteristics of the foregoing respective woven pile fabrics and knit pile fabric.

Samples for evaluation were prepared in accordance with the following procedure.

Two pieces that were each 1 cm square were cut from each of the selected piles subject to evaluation. Double-sided adhesive tape was used to respectively cause the two pieces that were cut from the piles subject to evaluation to be affixed to a metal plate serving as measurement terminal that was 30 mm square×200 mm in such fashion as to maintain the spacing therebetween such that there was a distance of 150 mm between respective pile centers, and the weights while still dry (dry weight) before application of grease were measured. A grease gun was used to apply the foregoing greases to the piles subject to evaluation that had been affixed thereto until the maximum impregnable amount was reached, and the weights thereof (weight following application of grease) were measured. Note that the maximum impregnable amount was determined by visual inspection. The weight following application of grease minus the dry weight was recorded as the amount of grease that had been applied thereto.

An evaluation apparatus at which a disk that was made of aluminum and that had a diameter of on the order of 200 mm was mounted on a turntable capable being made to rotate at any desired rotational speed in such fashion that the center thereof was aligned with the center of the turntable was prepared. The metal plate serving as measurement terminal to which the two pieces of pile subject to evaluation to which the foregoing grease had been applied were affixed was placed face down in such fashion that the midpoint between said two pieces of pile subject to evaluation was aligned with the center of rotation of the disk that was made of aluminum and that had a diameter of on the order of 200 mm and was made to come in contact therewith in such fashion as to cause the pile of the pile subject to evaluation to contact the disk that was made of aluminum and that had a diameter of on the order of 200 mm. The turntable of the evaluation apparatus was made to rotate for 5 minutes at a sliding speed of 500 mm/sec while a load having a total value of 30 N was applied to the two measurement terminals to which the piles subject to evaluation had been affixed from a location above the metal plate serving as measurement terminal.

After causing rotation to stop, the metal plate serving as measurement terminal to which the two pieces of pile subject to evaluation to which grease had been applied were affixed was removed therefrom and the weight thereof (weight following sliding) was measured. The weight following application of grease minus the weight following sliding was recorded as the amount of grease that had been applied thereto but that had migrated therefrom.

Evaluation was additionally carried out in similar fashion as above except for the fact that felt was employed instead of the pile subject to evaluation and the grease employed was lithium stearate grease (Grade No. 2).

Results

Results of evaluation are shown in TABLE 2-1 and TABLE 2-2, below.

that the crimped-type piles had better grease retention characteristics than the straight-fiber-type pile.

Furthermore, among the crimped fibers, the maximum impregnable amount of grease varied in accordance with the different densities thereof. In addition, among the crimped fibers, an increase in pile density resulted in an increase in surface area and an increase in the maximum impregnable grease amount thereof, permitting a larger amount of grease to be retained within the pile. It can be understood that when

TABLE 2-1

| Pile type | P-type: straight-fiber-type | | | C-type: crimped-type | | | | | |
|---|---|---|---|---|---|---|---|---|---|
| | | | | | | | Urea-type: | Mo-type: | Fluorinated |
| Grade No. | No. 1 | No. 2 | No. 3 | No. 1 | No. 2 | No. 3 | No. 2 | No. 2 | oil |
| Fiber density | 378,000/inch$^2$ | | | 316,050/inch$^2$ | | | | | |
| Maximum impregnable amount | 70 | | | 80 | | | | | 340 |
| Amount of grease that migrated therefrom | 26.0  34.1 | 34.5  25.9 | 30.0  26.2 | 25.3  23.2 | 20.7  21.2 | 17.7  16.2 | 20.9  21.0 | 22.1  25.5 | 224.2  202.7 |
| | 34.9  335 | 48.1  31.1 | 31.2  31.7 | 15.5  15.5 | 22.5  23.5 | 23.6  23.6 | 22.3  22.2 | 19.8  20.1 | 215.8  230.2 |
| | 34.0  34.7 | 38.2  33.6 | 31.4  34.5 | 17.5  15.1 | 20.5  20.3 | 25.4  25.3 | 14.1  16.8 | 21.1  20.4 | 200.8  205.6 |
| | 32.7  30.8 | 33.6  22.4 | 27.5  34.1 | 22.1  22.7 | 12.5  11.7 | 18.7  17.0 | 20.6  18.5 | 17.8  18.5 | 221.1  230.9 |
| | 29.6  35.8 | 23.4  22.8 | 32.7  35.3 | 8.8  10.1 | 18.4  24.4 | 22.2  26.0 | 21.4  20.8 | 19.9  16.5 | 214.1  219.5 |
| Average | 32.6 | 31.4 | 31.5 | 17.6 | 19.6 | 21.6 | 19.9 | 20.2 | 216.5 |

TABLE 2-2

| Pile type | G-type: crimped-type | | | | | | T-type: crimped-type | | | | | |
|---|---|---|---|---|---|---|---|---|---|---|---|---|
| Fiber density | 276,675/inch$^2$ | | | | | | 646,400/inch$^2$ | | | | | |
| Grade No. | No. 1 | | No. 2 | | No. 3 | | No. 1 | | No. 2 | | No. 3 | |
| Maximum impregnable amount | 80 | | | | | | 100 | | | | | |
| Amount of grease that migrated therefrom | 22.8 | 12.5 | 16.6 | 13.2 | 26.0 | 23.1 | 18.6 | 17.6 | 15.8 | 19.4 | 15.0 | 20.3 |
| | 14.6 | 12.9 | 19.8 | 28.9 | 30.0 | 26.3 | 8.2 | 17.2 | 25.7 | 24.5 | 23.7 | 16.3 |
| | 23.8 | 25.5 | 29.3 | 13.6 | 26.8 | 30.1 | 22.4 | 15.1 | 19.4 | 23.2 | 28.9 | 24.6 |
| | 17.5 | 22.0 | 18.9 | 17.3 | 23.1 | 32.3 | 23.1 | 13.3 | 24.6 | 22.0 | 21.8 | 25.7 |
| | 24.2 | 17.7 | 30.5 | 30.7 | 28.5 | 24.7 | 17.2 | 20.2 | 24.1 | 18.3 | 15.7 | 23.0 |
| Average | 19.4 | | 21.9 | | 27.1 | | 17.3 | | 21.7 | | 21.5 | |

| Pile type | B-type: crimped-type | | | Felt | |
|---|---|---|---|---|---|
| Fiber density | 179,968/inch$^2$ = 2.3 | | | 0.2 g/cm$^3$ | |
| Grade No. | No. 1 | No. 2 | No. 3 | No. 2 | |
| Maximum impregnable amount | 60 | | | 90 | |
| Amount of grease that migrated therefrom | 21.8  22.0 | 19.1  20.4 | 27.2  24.6 | 20.6 | 17.4 |
| | 19.8  18.8 | 22.5  26.0 | 29.3  26.1 | 18.8 | 17.9 |
| | 22.6  24.4 | 21.2  21.4 | 24.1  24.8 | 20.8 | 16.3 |
| | 19.1  16.9 | 22.8  21.3 | 20.4  22.1 | 19.4 | 18.5 |
| | 20.4  22.7 | 20.9  21.1 | 25.2  26.7 | 17.2 | 17.9 |
| Average | 20.9 | 21.7 | 25.1 | 18.5 | |

Based on the results presented in these tables, the following was learned with respect to grease retention characteristics and grease delivery characteristics.

The maximum impregnable amount of grease varied depending on the properties possessed by the pile that was used. In addition, in spite of their low densities and high surface areas, the crimped piles had larger maximum impregnable grease amounts and permitted larger amounts of grease to be retained within the pile. It can be understood crimped fiber is used, piles of higher densities will have better grease retention characteristics than piles of lower densities.

With respect to the amount of grease that migrated therefrom, this also varied depending on the properties possessed by the pile that was used. In addition, it is clear that the amount of grease which migrated from the piles that employed crimped fiber was greater than that which migrated from the pile that employed straight fiber. It can be understood that a larger amount of grease migrates in a shorter amount of time from straight-fiber-type pile—causing an excessive amount of grease to be delivered and decreasing the amount of time during which delivery of grease is possible—than from crimped-type pile.

In addition, as the P-type pile which had straight fiber had low surface area and was unable to retain grease, the amount of grease that migrated therefrom was the greatest. On the other hand, at the crimped-type C-type and G-type piles, where all or a portion of the fibers employed hollow porous fibers, it is thought that the fact that this caused these to be more crimped than they otherwise would have been was responsible for the increase in surface area and increase in the amount of grease retained thereby. In addition, based on the results obtained with the crimped-type C-type pile, it was found not only with the lithium-type greases such as lithium stearate grease but also with the urea-type grease and the molybdenum-type grease as well that equivalent characteristics were indicated with respect to grease retention characteristics and grease delivery characteristics. On the other hand, with the crimped-type B-type pile, despite the fact that pile thickness was small, the maximum impregnable amount of grease was small, and density was low, there was no tendency toward occurrence of a dramatic increase in the amount of grease that migrated therefrom as compared with the other crimped-type piles.

Based on the foregoing, it is clear that by using hollow porous fiber in pile employed at a wet end portion seal member for a linear motion mechanism and by increasing surface area, it will be possible to increase the amount of grease that is retained by the pile, reduce the tendency for the grease retained thereby to migrate therefrom, and inhibit excessive delivery of grease while also permitting achievement of a longer time during which delivery of grease is possible.

During use in a production setting, it being difficult during use to supply grease to the pile in a wet end portion seal member for a linear motion mechanism, because they will permit continuous use for longer times, use of C-type or T-type pile, for which the amounts of grease that migrate therefrom in a given period of time are small and which permit continuous delivery of grease for longer times, is preferred.

On the other hand, when fluorinated oil was used, because the viscosity thereof was much lower than that of the foregoing lithium grease, grease in which a molybdenum compound was blended, and urea-type grease, the maximum impregnable amount of oil was 340 mg, which means that it was possible to cause four or more times as much impregnation therewith, but a correspondingly large amount of fluorinated oil migrated therefrom, 60% or more of the impregnated amount migrating therefrom, as a result of which the amount of oil remaining within the pile was less than 40%. For this reason, as the amount of oil which remained within the pile was less than was the case for the foregoing lithium grease, grease in which a molybdenum compound was blended, and urea-type grease, this constitutes a problem with respect to endurance. Furthermore, these results raise concern that low-viscosity fluorinated oil might leak into the interior of the device of the linear motion mechanism and mix with other lubricants, and might decrease performance below that which is expected and cause occurrence of faulty operation.

Exemplary Test 2: Determination of Seal Performance of Wet End Portion Seal Member Units Materials and Methods Evaluation Method Seal members were attached to either end of a linear motion guide and sliding was made to occur for the designated time at the designated speed, following which seal performance was measured.

The piles employed were similar to those employed at Exemplary Test 1. Moreover, for comparative purposes, testing was carried out using felt similar to that used at Exemplary Test 1 and an existing product employing an end seal furnished with a nip which was made of elastomer material instead of said pile.

Pile of 5-mm width which was molded in the shape of the outside circumference of a linear guide was affixed to a plate that was attached to the end of the linear motion guide, grease in the form of lithium stearate grease (Grade No. 2) being applied thereto in an amount sufficient to cause the amount of grease on the pile to be 4 mg/cm$^2$ to fabricate a seal member serving as sample for evaluation. For the C-type pile, a sample was additionally fabricated at which the fluorinated oil used at Exemplary Test 1 was applied thereto instead of the lithium stearate grease (Grade No. 2).

In addition, the seal members fabricated for either end of the linear motion guide were arranged in such fashion as to cause the width of the gap between the rail and the pile support frame body to be 2.0 mm, and the pile was made to bend as it was placed in an abutting relationship with respect thereto so as to occlude the region between the rail and the pile support frame body. Moreover, paper dust was sealed within a box which was placed in the region between the rail and the seal members provided at either end of said linear motion guide. For the C-type pile, a test apparatus was additionally fabricated at which, instead of paper dust, toner was sealed within a box which was placed thereat.

Then, to cause sliding to occur at the linear motion guide and investigate seal characteristics with respect to paper dust and toner at the seal members, the linear motion guide was made to engage in sliding under conditions such that the linear motion guide was driven in idler fashion continuously for an evaluation time that was a maximum of 24 hours at a maximum speed of 400 mm/sec, and the degree to which leakage of paper dust or toner had occurred and the degree to which paper dust or toner had entered the pile at the foregoing seal members was determined.

The apparatus was stopped when paper dust or toner penetrated the 5-mm width pile and leaked out therefrom. If paper dust or toner did not leak out therefrom, the seal characteristics thereof were evaluated by measuring the amount of paper dust or toner that had entered the fibers of the wet pile making up the seal member. When paper dust or toner had leaked out therefrom such that the amount which entered thereinto was 5 mm or more, a notation was made to the effect that leakage of paper dust or toner had occurred to such an extent as to make usage impractical (indicated by an × in the tables).

Results

Results of evaluation are shown in TABLE 3-1 and TABLE 3-2, below.

occurrence of gaps between fibers, which tends to cause leakage of paper dust to occur. To achieve seal characteristics with straight-fiber-type pile, it is possible to address this

TABLE 3-1

| | | With Grease | | | | | | | | | |
|---|---|---|---|---|---|---|---|---|---|---|---|
| | | P-type: straight-fiber-type | | C-type: crimped-type | | | | | | G-type: crimped-type | |
| | | | | Paper dust | | Toner | | Oil | | | |
| Enmesh-ment | Encroach-ment | Enmesh-ment: 0.8 mm | Enmesh-ment: 0.5 mm | Enmesh-ment: 0.8 mm | Enmesh-ment: 0.5 mm | Enmesh-ment: 0.8 mm | Enmesh-ment: 0.5 mm | Enmesh-ment: 0.8 mm | Enmesh-ment: 0.5 mm | Enmesh-ment: 0.8 mm | Enmesh-ment: 0.5 mm |
| Yes | Gap: 1.5 mm | 3.01 | 1.43 | 0.98 | 0.87 | 0.92 | 0.84 | 1.85 | 1.66 | 1.04 | 0.80 |
| | Gap: 2.0 mm | x | x | 1.16 | 1.15 | — | — | — | — | 1.01 | 1.10 |
| | Gap: 2.3 mm | x | x | 3.05 | 155 | — | — | — | — | x | 4.52 |
| No | Gap: 1.5 mm | 1.92 | x | 1.31 | 1.17 | 1.12 | 1.04 | 2.21 | 2.09 | 133 | 0.86 |
| | Gap: 2.0 mm | x | x | 1.74 | 152 | — | — | — | — | 1.76 | 1.44 |
| | Gap: 2.3 mm | x | x | 3.96 | 1.81 | — | — | — | — | x | 3.02 |

| | | T-type: crimped-type | | B-type: crimped-type | | Existing product | Felt |
|---|---|---|---|---|---|---|---|
| | | | | | | (end seal) | Gap 2.3 |
| | | | | | | x | x |
| Enmesh-ment | Encroach-ment | Enmesh-ment: 0.8 mm | Enmesh-ment: 0.5 mm | Enmesh-ment: 0.8 mm | Enmesh-ment: 0.5 mm | | |
| Yes | Gap: 1.5 mm | 1.05 | 1.00 | 2.31 | 2.05 | | |
| | Gap: 2.0 mm | 1.49 | 1.04 | x | x | Only evaluated with grease because was in production environment Leakage of paper dust occurred | Could only be inserted when gas was 2.3 mm Leakage occurred at corners |
| | Gap: 2.3 mm | 1.66 | 1.26 | x | x | | |
| No | Gap: 1.5 mm | 1.42 | 1.21 | 3.22 | 3.11 | | |
| | Gap: 2.0 mm | 1.59 | 141 | x | x | | |
| | Gap: 2.3 mm | 1.89 | 1.93 | x | x | | |

Note
that x indicates occurrence of leakage (5.00-mm incursion)

TABLE 3-2

| | | Without Grease | | | | | | | | | |
|---|---|---|---|---|---|---|---|---|---|---|---|
| | | P-type: straight-fiber-type | | C-type: crimped-type | | G-type: crimped-type | | T-type: crimped-type | | B-type: crimped-type | |
| Enmesh-ment | Encroach-ment | Enmesh-ment: 0.8 mm | Enmesh-ment: 0.5 mm | Enmesh-ment: 0.8 mm | Enmesh-ment: 0.5 mm | Enmesh-ment: 0.8 mm | Enmesh-ment: 0.5 mm | Enmesh-ment: 0.8 mm | Enmesh-ment: 0.5 mm | Enmesh-ment: 0.8 mm | Enmesh-ment: 0.5 mm |
| Yes | Gap: 1.5 mm | x | x | x | x | x | x | x | x | x | x |
| | Gap: 2.0 mm | x | x | x | x | x | x | x | x | x | x |
| | Gap: 2.3 mm | x | x | x | x | x | x | x | x | x | x |
| No | Gap: 1.5 mm | x | x | x | x | x | x | x | x | x | x |
| | Gap: 2.0 mm | x | x | x | x | x | x | x | x | x | x |
| | Gap: 2.3 mm | x | x | x | x | x | x | x | x | x | x |

Note
that x indicates occurrence of leakage (5.00-mm incursion)

When grease was not applied to pile, under all conditions tested, paper dust or toner penetrated the 5-mm width pile and leaked out therefrom. On the other hand, when grease was applied to pile, because it was found that there were samples for which there was no occurrence of leakage of paper dust despite the fact that sliding had been made to occur continuously for 24 hours, it can be understood that an extremely high degree of seal performance with respect to paper dust was imparted thereto as a result of application of grease to the pile.

In addition, seal performance varied depending on the properties of the pile that was used, it being found that seal characteristics were worse, and the extent to which there was incursion into the pile was greater, for the straight-fiber-type pile than for the crimped-type piles. With straight-fiber-type pile, it is thought that the absence of crimping causes by setting the width of the gap between the guide rail of the linear motion guide and the seal member so as to be smaller than it otherwise would be. However, this has the disadvantage that it will increase sliding resistance.

It was found that seal members employing crimped-type pile were such that seal characteristics with respect to paper dust varied depending on the type of pile that was used. With G-type pile, increasing gap width to as much as 2.3 mm resulted in increased incursion by paper dust into pile and caused occurrence of paper dust leakage. It is thought that this might be a consequence of G-type pile's having worse grease retention characteristics than those of C-type or T-type pile, which could have caused occurrence of locations at which seal characteristics were imperfect, which as a result might have caused leakage of paper dust to occur. When C-type pile that had been made to retain grease was used with a gap width of 1.5 mm, similarly good seal characteristics were exhibited thereby with respect to both paper dust and toner. On the other hand, because the density of the T-type pile was high, the amount of incursion into pile by paper dust was low under all conditions tested.

Regarding enmeshment of pile, samples at which the fiber tip portions of the cut pile were bent and made to abut the rail such that there was enmeshment thereof as a result of contact with the rail so as to occlude the gap between the rail and the support frame body tended to have better seal characteristics overall, the C-type and G-type piles in particular exhibiting a large sealing effect when the pile was enmeshed. However, when width of the gap was 2.3 mm and only the pile fiber tips were enmeshed, seal characteristics were not improved, as the effect was small. Furthermore, when width of the gap was 1.5 mm to 2.0 mm such that there was substantial enmeshment, it was found that seal characteristics could be improved even where pile density was low. With B-type pile, because thickness of the pile was small for reasons related to the constitution thereof, while an adequate seal was not achieved during the present testing in which gap width was made as small as 1.5 mm, it can be understood that it should be possible to expect that adequate seal characteristics might be achieved if the gap width were to be made even smaller.

On the other hand, with the existing end seal, paper dust leaked out from the front, making sealing impossible.

Figure 3:
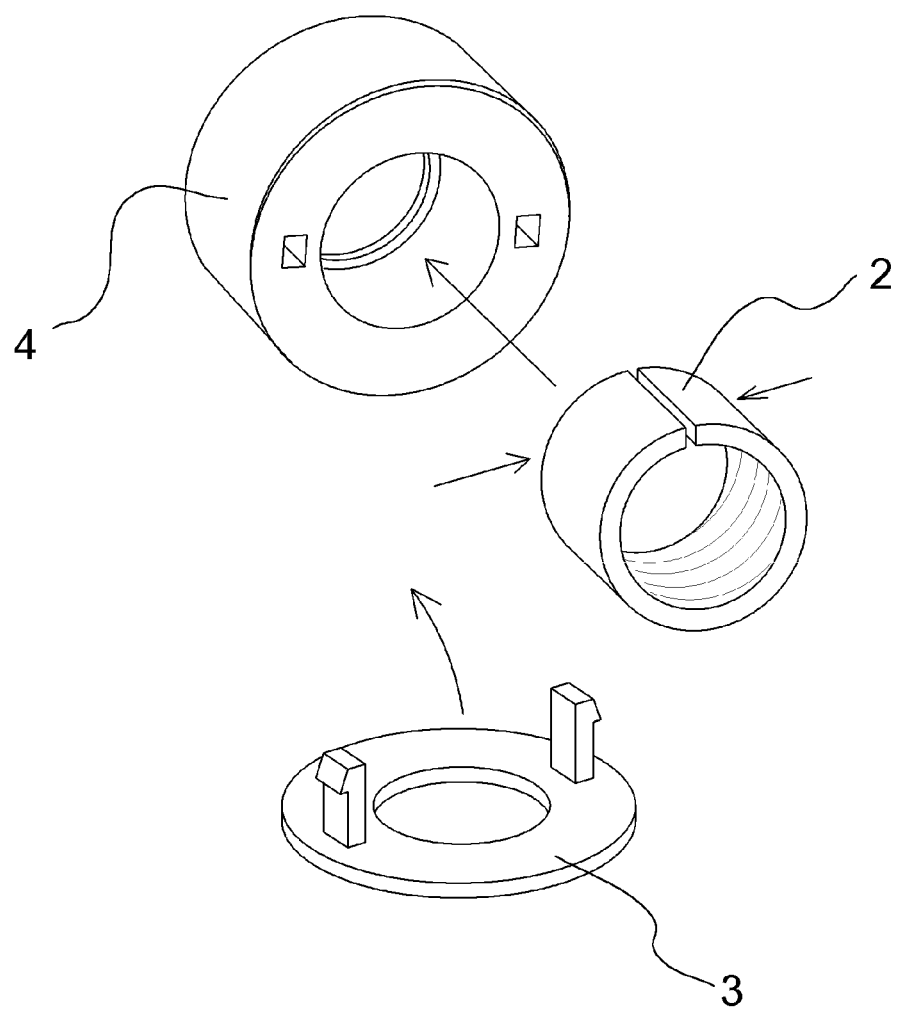
FIG. 3 Drawing illustrating an embodiment of a wet end portion seal member having cut pile in accordance with the means of the present invention. Shown is a procedure for causing a plate to be inserted in and secured to a support frame body in such fashion as to prevent a wet sealing member from coming free from the support frame body after the wet sealing member which has grease-containing pile is inserted therein and caused to be arranged in helically opposed fashion with respect to the groove of a ball screw for a length permitting at least one to three turns at a location such as will cause it to be arranged in helically opposed fashion with respect to the groove of the ball screw in the support frame body that will be arranged about the outside circumference of the male-threaded shaft of the ball screw.
Figure 4:
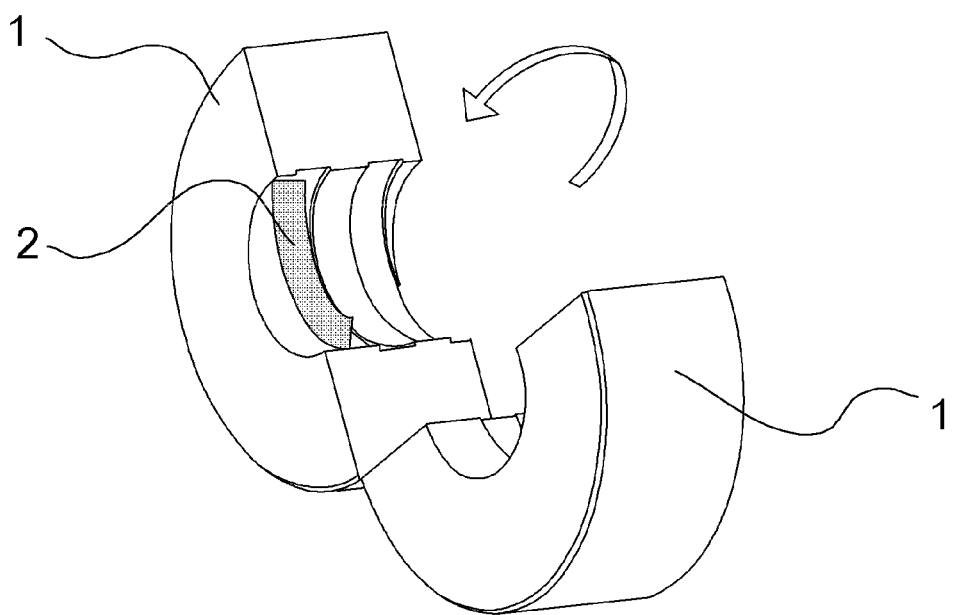
FIG. 4 Drawing illustrating an embodiment of a wet end portion seal member having cut pile in accordance with the means of the present invention. Shown is a procedure for causing a split support frame body that will be arranged about the outside circumference of the male-threaded shaft of a ball screw to cover and be made integral with the ball screw at any desired location along the ball screw after a wet sealing member which has pile that contains a stripe-like arrangement of grease is caused to be arranged in opposed fashion at a location such as will cause it to be arranged so as to respectively helically oppose the peaks and troughs of the groove of the ball screw.
Figure 5:
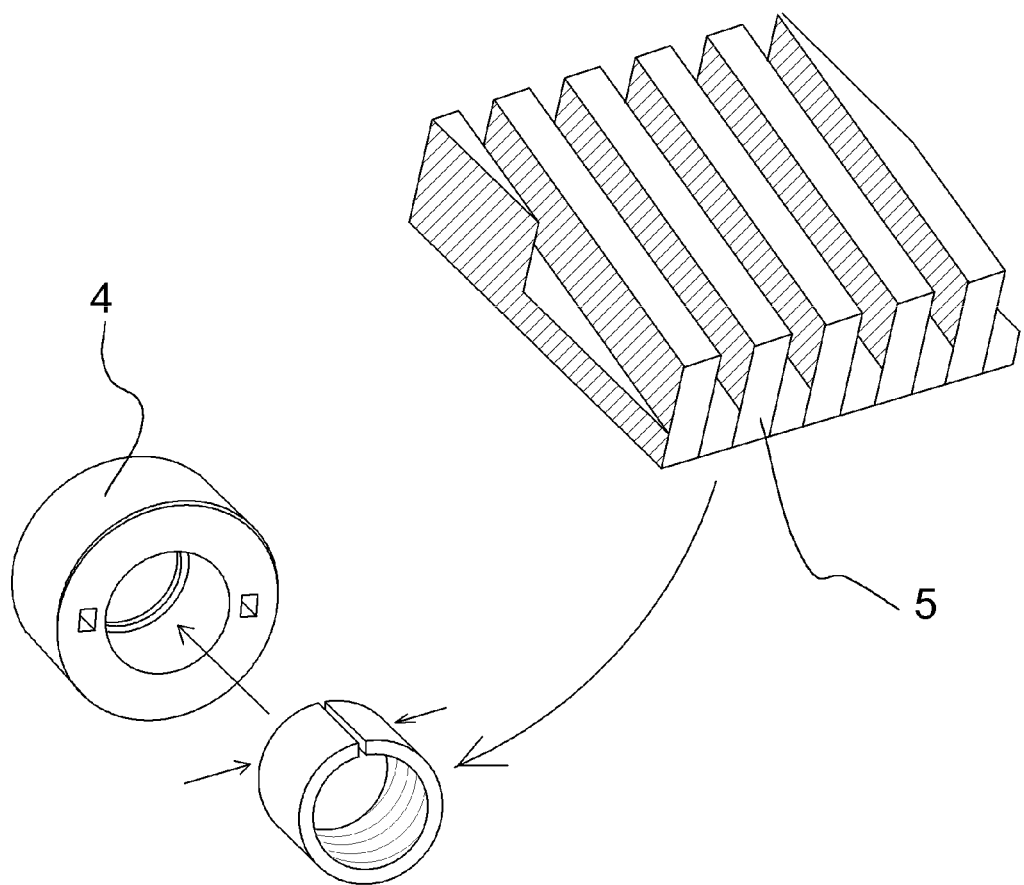
FIG. 5 Drawing illustrating an embodiment of a wet end portion seal member having cut pile in accordance with the means of the present invention. Shown is a procedure for causing a grease-containing wet sealing member in which pile has been cut in stripe-like fashion so as to helically conform to the groove of a ball screw so as to permit it to be arranged in helically opposed fashion with respect to the groove of the ball screw for a length permitting not less than one turn to be inserted in and made integral with a support frame body that will be arranged about the outside circumference of the male-threaded shaft of the ball screw, in such fashion as to at least be arranged in helically opposed fashion with respect to the groove of the ball screw.

Furthermore, where felt was employed, as onset of the trend toward increase in reactive-force-producing load occurred earlier than for pile, it is clear that the narrow range of usable gap widths would make adjustment during attachment difficult, and that even if successfully attached there would be a risk of later occurrence of elevated torque (FIG. 3). Furthermore, with respect to seal characteristics as well, as leakage occurred from the corners of the felt, it was clear that it was not suitable as a material for a seal member.

Based on the foregoing, it is clear from the standpoint of seal characteristics that crimped-type fibers had the better seal characteristics, could be better made to compensate for seal characteristics when enmeshed, and permitted fabrication of a cheaper seal member.

Exemplary Test 3: Determination of Sliding Resistance of Wet End Portion Seal Member Units Materials and Methods Evaluation Method Seal members were attached to either end of a linear motion guide and sliding was made to occur for the designated time at the designated speed, following which sliding resistance was measured.

Pile similar to that used at Exemplary Test 1 was used. Pile of 5-mm width which was molded in the shape of the outside circumference of a linear guide was affixed to a plate that was attached to the end of the linear motion guide, grease in the form of lithium stearate grease (Grade No. 2) being applied thereto in an amount sufficient to cause the amount of grease on the pile to be 4 mg/cm$^2$ to fabricate a seal member serving as sample for evaluation. In addition, the seal members fabricated for either end of the linear motion guide were arranged in such fashion as to cause the width of the gap between the rail and the pile support frame body to be 2.0 mm, and the pile was made to bend as it was placed in an abutting relationship with respect thereto so as to occlude the region between the rail and the pile support frame body.

The linear motion guide was then driven continuously in idler fashion, having been set for a maximum speed of 400 mm/sec and an evaluation time of 30 minutes, following which it was stopped, and the linear motion guide was pushed with the probe of a force gauge to measure the value of the sliding resistance thereof Results Results of evaluation are shown in TABLE 4, below.

TABLE 4

| Grease | Enmesh-ment | P-type: straight-fiber-type | | C-type: crimped-type | | G-type: crimped-type | | T-type: crimped-type | | B-type: crimped-type | | Existing product (end seal) |
|---|---|---|---|---|---|---|---|---|---|---|---|---|
| | | Enmesh-ment: 0.8 mm | Enmesh-ment: 0.5 mm | Enmesh-ment: 0.8 mm | Enmesh-ment: 0.5 mm | Enmesh-ment: 0.8 mm | Enmesh-ment: 0.5 mm | Enmesh-ment: 0.8 mm | Enmesh-ment: 0.5 mm | Enmesh-ment: 0.8 mm | Enmesh-ment: 0.5 mm | |
| Yes | Yes | 284 | 275 | 314 | 335 | 303 | 326 | 350 | 371 | 241 | 240 | 758 |
| | No | 254 | 260 | 298 | 291 | 281 | 282 | 341 | 341 | 241 | 237 | 227 (Without seal member) |
| No | Yes | 304 | 310 | 332 | 347 | 331 | 351 | 371 | 401 | 248 | 240 | Only with grease because predicated on use in production environment |
| | No | 290 | 290 | 328 | 334 | 317 | 322 | 362 | 373 | 250 | 243 | |

[gf]

Based on the results presented in these tables, the following was learned with respect to the sliding resistance of end portion seal members for linear motion mechanisms.

It is clear that there was an overall tendency for sliding resistance to be lower when pile was impregnated with grease to obtain a wet end portion seal member than when the pile was not impregnated with grease. Furthermore, it is clear that while causing the pile to press against the rail of the linear guide such that it became enmeshed permitted improvement in seal characteristics, it also caused sliding resistance to increase.

With the linear motion mechanism end portion seal members that employed the P-type pile which had straight fiber, due to the fact that these employed straight fiber, there was little resistance with respect to the rail of the linear guide, and the sliding resistance thereof was low.

With the linear motion mechanism end portion seal members that employed crimped-type C-type and G-type piles, whereas—perhaps due to the fact that the fibers were of similar morphology—similar sliding resistances were obtained, sliding resistance of the G-type pile was slightly lower due to the difference in density.

With the crimped-type T-type pile, while seal characteristics were good due to the fact that density was high, sliding resistance—perhaps due to the fact that this employed crimped fiber employing split fiber—was higher than at other samples.

At the B-type pile, because the gap was 2.0 mm whereas pile thickness was 2.3 mm, the yarn of the pile encroached upon the rail of the linear guide only slightly, and so sliding resistance was generally low, conditions not being such as would cause sliding resistance to increase.

And regarding the end seal existing product which was employed for comparative purposes, as this was predicated on use in a production setting, evaluation was conducted by carrying out similar testing but only under the "with grease" conditions, whereupon because the end seal existing product employed elastomer material, there was a large amount of resistance due to the lip, sliding resistance being higher than was the case when pile was employed.

From the foregoing, while there is a benefit to be had in terms of seal characteristics when sliding resistance is made high, based on the results of the exemplary tests that were done which employed C-type and G-type piles, the results were such as to make it understood that causing pile to press against the rail of the linear guide such that it becomes enmeshed will make it possible to achieve adequate seal characteristics even when sliding resistance is low.

Exemplary Test 4: Determination of Ball Screw Seal Characteristics

From the foregoing respective results at Exemplary Test 1, it was found that a wet end portion seal member comprising cut pile in which grease has been made to be retained in advance in the spaces between the pile fibers of the cut pile is such that by causing the fiber tip portions of the cut pile at which grease has been made to be retained in advance in the spaces between the pile fibers to abut the rail and bend so as to occlude the gap between the rail and the support frame body will make it possible to achieve adequate seal characteristics in extremely effective fashion even when sliding resistance is low.

With ball screws, unlike linear motion mechanisms in which the majority of gaps to be filled are made up of flat surfaces, it so happens that gap shapes are made up of more complex curved surfaces, but as with linear motion mechanisms, it is necessary to prevent entry of and intermingling with particulate and contaminants, and achievement of good seal characteristics is sought. While brush seals comprising brushes that have been molded into annular shapes are employed as seal members in conventional products, there are none that permit achievement of adequate seal characteristics at ball screw troughs.

Testing was therefore carried out to determine whether it might be possible to similarly achieve adequate seal characteristics in the context of a ball screw in which the shape of the gap at the support frame body is more complex by causing fiber tip portions of cut pile at which grease has been made to be retained in advance in spaces between pile fibers to bend in conforming fashion with respect to the ball screw so as to occlude the gap.

Materials and Methods

Evaluation Method

A seal member was attached to the end of a ball screw and sliding was made to occur for the designated time at the designated speed, following which seal performance in terms of seal characteristics was evaluated based on the amount and distribution of toner that remained on the surface of the groove of the rail of the ball screw.

A ball screw in which a nut and a male-threaded shaft provided with an arcuate continuous groove threadedly engage by way of a multiplicity of steel spheres inserted between male threads and female threads, the nut being capable of being made to travel forward and backward along the male-threaded shaft; an end portion seal member at which helically arrayed at the inside circumference of a support frame body is C-type pile arranged in helical fashion at the inside circumference of the support frame body in such fashion as to oppose the groove for a length corresponding to not less than one rotation of the outside circumference of the male-threaded shaft and which is attached toward the front or toward the back from the nut of said ball screw; and C-type pile for causing helical arrayal thereof at the inside circumference of said support frame body in such fashion as to oppose the groove for a length corresponding to not less than one rotation of the outside circumference of the threaded shaft at a pitch equal to that of the groove of the ball screw were prepared.

The C-type pile was installed at the inside circumference of said support frame body in such fashion as to oppose the groove for a length corresponding to not less than one rotation of the outside circumference of the threaded shaft. In addition, grease in the form of lithium stearate grease (Grade No. 2) was applied to the C-type pile in an amount sufficient to cause the amount of grease on the pile to be 4 mg/cm$^2$, a plate was further secured in snap-fit fashion to the insertion end face so as to prevent the pile from coming free therefrom to obtain an end portion seal member serving as sample for evaluation, following which this was attached toward the front or toward the back from the ball screw nut.

Toner (particle diameter: 5 μm) was then sprinkled on the groove of the ball screw, following which the ball screw was made to slide by hand so as cause it to cause actuation thereof for 10 reciprocating cycles, following which it was stopped, and the amount and distribution of toner that remained on the surface of the groove of the rail of the ball screw was determined.

Testing was additionally carried out using a similar procedure except for the fact that a ball screw brush seal existing product that had been molded into an annular shape was employed for comparative purposes instead of the foregoing end portion seal member that served as sample for evaluation, and the amount and distribution of toner that remained on the surface of the groove of the rail of the ball screw was determined.

Results

As a result of evaluation, it was determined that the results which were obtained were such as to suggest that use of an end portion seal member employing wet pile in accordance with the present invention makes it possible even in situations in which the surface(s) to be sealed are made up of arcuately recessed more or less curved surface(s) such as is the case with the groove of a ball screw to achieve adequate seal characteristics at the groove constituting the troughs of the ball screw without any fine dust from toner remaining at any of the various locations therein such that there is no occurrence of entry of toner into the bearings constituting rolling bodies therein.

In addition, it was determined that the device of the present invention made it possible for fiber tip portions of pile to make contact in such fashion as to bend and occlude gap(s) at the ball screw, and particularly gap(s) at the troughs of the ball screw, and also to be helically arrayed so as to abut the bearings constituting rolling bodies therein, as a result of which entry of fine dust from toner thereinto was prevented by the lubricant that had been made to be retained in advance in the spaces between the pile fibers as the fine dust from the toner was swept by the pile and the fiber tip portions thereof to achieve a seal so effective as not to have been achievable by the conventional art. It can be understood that the fact that pile materials used in the context of the present invention conform to and uniformly abut the ball screw and also the fact that without occurrence of leakage from abutting surfaces it is moreover the case that employment of lubricant that has been made to be retained in advance in spaces between pile fibers make it possible to obtain sealing effect and sweeping effect with respect to toner and/or other such fine dust in the context of ball screws of various configurations.

In contradistinction with respect thereto, with the existing brush seal which was a conventional product, it was determined that bands of fine dust from toner remained at various locations within the ball screw, it being the case in particular that bands of fine dust from toner remained at the troughs that were pressed on by the bearings constituting rolling bodies therein, and moreover that the situation was such that clumps of toner remained here and there therewithin. It was found with the existing brush seal which was a conventional product that the seal characteristics could not be achieved at the ball screw troughs, and that there was occurrence of toner at the bearings constituting rolling bodies therein.

It is thought that because the existing brush seal was a brush that had been molded into an annular shape, this may have caused occurrence of locations that were not touched by the brush due to the fact that the brush may not have uniformly abutted the ball screw. Close inspection was therefore carried out with respect to what abutment might exist between the existing brush seal and the ball screw, whereupon it was determined that due to the difference in height between ball screw troughs and peaks there were locations at troughs that were completely untouched despite the bending of the brush. When the surface(s) to be sealed are made up of more or less curved surface(s) such as is the case with the groove of a ball screw, it is clear that it would be difficult with an existing brush seal to seal said surfaces against intrusion by contaminants.

EXPLANATION OF REFERENCE NUMERALS

1 Support frame body arranged at outside circumference of male-threaded shaft in split ball screw
2 Wet sealing member which contains grease and which is arranged in helically opposed fashion with respect to the groove of a ball screw
3 Plate secured to support frame body arranged at outside circumference of male-threaded shaft of ball screw to prevent wet sealing member which contains grease and which is arranged in helically opposed fashion with respect to the groove of the ball screw from coming free therefrom
4 Support frame body arranged at outside circumference of male-threaded shaft in ball screw
5 Wet sealing member which contains grease and in which pile has been cut in stripe-like fashion so as to helically conform to the groove of a ball screw so as to permit it to be arranged in helically opposed fashion with respect to the groove of the ball screw

The invention claimed is:

1. For a ball screw in which a nut and a male-threaded shaft provided with an arcuate continuous groove threadedly engage by way of a multiplicity of steel spheres inserted between the male threads and female threads, the nut being capable of being made to travel forward and backward along the male-threaded shaft, a wet end portion seal member comprising cut pile, wherein
   the end portion seal member is capable of being attached toward a front or toward a back from said nut, and comprises:
   a support frame body arranged at an outside circumference of said male-threaded shaft;
   a base fabric portion, a back surface of which is secured to an inside circumferential surface of said support frame body; and
   the cut pile that protrudes in such fashion as to be directed toward said groove from a front surface of said base fabric portion;
   wherein fiber tip portions of said cut pile are bent and made to abut said groove in such fashion as to occlude a gap between said groove and said support frame body;
   a lubricant has been made to be retained in advance and following forward and backward movement in spaces between pile fibers of said cut pile, and
   wherein the cut pile is helically arranged at an inside circumference of the support frame body in such fashion as to oppose the groove for a length corresponding to not less than one rotation of the outside circumference of the male-threaded shaft.

2. The end portion seal member according to claim 1, wherein the lubricant retained in the spaces between the pile fibers of the cut pile is grease for which a grade number as defined at JIS K2220 is No. 1 to No. 4.

3. The end portion seal member according to claim 2, wherein the grease is any among lithium grease, grease in which molybdenum compound has been blended, and urea-type grease.

4. The end portion seal member according to claim 1, wherein pile length of the cut pile is not less than 2 mm.

5. The end portion seal member according to claim 1, wherein the pile fibers of the cut pile consist of crimped multifilament fiber.

6. The end portion seal member according to claim 1, wherein the cut pile comprises woven fabric.

7. The end portion seal member according to claim 1, wherein the cut pile comprises knit fabric.

8. The ball screw provided with the male-threaded shaft, the nut, and the steel spheres wherein the end portion seal member according to claim 1 is secured in removably attachable and replaceable fashion toward each the front and the back from said nut.

* * * * *